May 8, 1934.  G. L. KELLEY  1,958,146
METHOD OF REMOVING WELDING FLASH
Filed March 10, 1931   5 Sheets-Sheet 1

INVENTOR.
GEORGE L. KELLEY.
BY

ATTORNEY.

May 8, 1934. G. L. KELLEY 1,958,146
METHOD OF REMOVING WELDING FLASH
Filed March 10, 1931 5 Sheets-Sheet 3

INVENTOR.
GEORGE L. KELLEY
BY
ATTORNEY.

May 8, 1934.  G. L. KELLEY  1,958,146

METHOD OF REMOVING WELDING FLASH

Filed March 10, 1931   5 Sheets-Sheet 4

INVENTOR.
GEORGE L. KELLEY
BY
ATTORNEY.

May 8, 1934.  G. L. KELLEY  1,958,146
METHOD OF REMOVING WELDING FLASH
Filed March 10, 1931    5 Sheets-Sheet 5

INVENTOR.
GEORGE L. KELLEY
BY
ATTORNEY.

Patented May 8, 1934

1,958,146

UNITED STATES PATENT OFFICE 1,958,146

METHOD OF REMOVING WELDING FLASH

George L. Kelley, Philadelphia, Pa., assignor to Edward G. Budd Manufacturing Co., Philadelphia, Pa., a corporation of Pennsylvania Application March 10, 1931, Serial No. 521,490

9 Claims. (Cl. 29—148)

The method of my invention relates especially to the removal of flash from sheet stock of very large area, which stock as a product is produced by the flash welding together of a number of smaller sheets usually along a rectilinear seam. In the evolution of this method, however, so many problems of consequence were encountered and solved in such fundamental ways as to render it capable of application with great utility to the removal of flash or its equivalent not only from joints produced by other methods of welding, and joints or seams of different form, and flash of various kinds, but also to products which differ more or less widely from the sheet metal stock constituting the immediate product operated upon. In fact, it is considered that the invention is applicable with modifications as necessary to articles in general which may be fabricated by flash welding or the like. These things will be apparent upon an understanding of the invention and the extent of its scope.

According to the improved method, the article fabricated by flash welding is drawn past relatively fixed cutters engaged with the flash. The flash of the flash welded seam ordinarily, though not necessarily, appears on both faces of the seam. The method contemplates simultaneous and opposite engagement on the opposed faces of the seam. The article is progressed past the cutters longitudinally of the seam and in engagement therewith continuously. The pull is exerted at a multiple number of points, preferably two, symmetrically disposed on opposite sides of the seam, and is further exerted in directions parallel in general to the direction of extent of the seam. During the cutting operation the body of the article in the zone about the cutting operation at any instant is supported throughout an expansive area on both sides against distortion by the forces of cutting. This support also coacts with the symmetrical application of the forces of draft to prevent distortion of the sheet at large and incident irregularities.

The method of the present invention further consists of the order of succession of operations and the relative degrees of those operations which combine in the attainment and maintenance of an extremely high efficiency and quality of work. Prior to removing the main body of the flash by cutting, all portions of the flash which are readily removed by impacting are removed, whereby impact of the means used for removing the main body may not preliminarily dislodge these impactually dislodgeable portions and resultantly scar the surface of the article through abrasion when they are jammed in cutters or other devices. Also prior to removal of the body of the flash by cutting the refuse removed by impact and all other refuse from the flash or other sources, is removed likewise to preclude abrasion.

The main body of the flash is removed by the cutters not absolutely to the plane of the surface of the main body of the sheet stock product, but to a plane closely adjacent thereto and so closely adjacent as possible without causing the cutter edge itself to engage the surfaces flanking the flash and cut and scar the same. In other words, the main body of the flash is removed by the cutters down to a plane having such tolerance relation to the surface of the body of the sheet stock product as will admit of the usually encountered surface undulations in sheet stock without cutting of the surface flanking the flash by the cutting tool. The remainder of the body of the flash between the plane of cutting and the surface of the sheet stock product is then removed by a progressive forging operation, preferably a hammering operation. Presumably this forging operation is conducted in two stages, each stage progressive in accordance with the progressing of the work under the pull past the fixed cutters which achieve the removal of the main body of the flash, and the final stage results in the reduction of the seam to the gauge of the body of the sheet stock product.

Intermediate the removal of the main body of the flash to the depth of the minimum permissible tolerances and the abolition of the remainder through the forging reduction of the seam to the gauge of the sheet, refuse of all sorts, particularly the vagrant refuse comprised of loose chips of the main body of the flash as first removed, is cleanly removed from the regions of the seam, whereby none of it may become interposed between the forging devices and the product with resultant scarring and other irregularities. The substance of the flash is extremely hard due to high heat and sudden quenching in the presence of extreme oxidation in the process of flash welding. The complete removal of such refuse from the regions of the seam is very important both in this stage as well as in the earlier stages of the method. As a matter of fact, the devices used for refuse removal are such as to remove refuse entirely from the sheet steel product.

Apparatus illustrative of the preferred means by which this improved method may be carried out comprises a draw bench peculiarly adapted to pull the sheet stock product over the top of the bench against the powerful reaction of the cutters engaging the very hard substance of the flash without distortion of the sheet. The pulling means is arranged to engage and exert its draft on the sheet along parallel lines spaced apart and symmetrical as respects the seam from which the flash is to be removed. The flash removing cutters are supported transversely of the draw bench, and are of a form engaging the surfaces of the sheet stock product in the region of cutting over an expansive area whereby to prevent local distortion and whereby to coact with the symmetrical draft of the draw bench to prevent not only local distortion but general distortion of the sheet which might result in irregular operation or jamming of the product in the machine. Moreover, opposed cutters are used engaging opposite sides of the seam oppositely and simultaneously whereby their reactions in directions normal to the body of the sheet stock product are balanced and whereby their support of the sheet against both localized and general distortion is a symmetrical and balanced such support. The means for removing the refuse in advance of cutting the main body of the flash consists of a rotary brush likewise transversely supported. The forging devices for reducing what remains of the flash after the removal of the main body to the gauge of the body of the sheet stock product are in the form of a series of forging hammers likewise arranged transversely of the draw bench. Their setting is such that the advance hammer or hammers partially reduce the remainder of the flash to gauge and the final hammer or hammers complete the reduction to gauge. Means for removing refuse present between the cutters removing the main body of the flash and the forging devices is a duplex means consisting of compressed air nozzles and rotary brushes in combination, likewise supported transversely of the sheet.

While the present invention is directed to the method of removing welding flash, the apparatus disclosed herein is illustrative of one form of machine adapted for carrying out the improved method, said apparatus and machine is embodied in applicant's copending application Serial No. 627,075, filed July 30, 1932.

The apparatus for performing the improved method will be more readily and fully understood and its refinements of detail pointed out from the accompanying drawings. Upon a full understanding of the apparatus the method will be the more fully appreciated.

The draw bench generally is designated 20. Its main body is comprised of a pair of channel beams 21 spaced apart and supported on their sides from the foundations 22 by an underlying structure designated generally 23. This underlying structure may be a base of any form whatsoever which may be desired and indeed, the foundation 22 may be the base. The longitudinally extended beams 21 support at their opposite ends transverse shafts 24 and 25 carrying draft chain sprockets 26—27 over which is run heavy draft chain 28. Sprockets 26—27 are in spaced pairs the individuals of which lie closely adjacent the inner faces of the beams 21, and independent chains 28 are run over the corresponding sprockets 26—27 of the pairs. Upper and lower guideways 29 and 30 parallel to the tops of the beams 21 underlie the body of the chain 28 substantially for its full extent and maintain it truly horizontal in its travel. These guideways are in the form of channels appropriately supported in this instance as indicated from the inner faces of the beams 21 and their supports 23. The faces of these guides are, of course, appropriately lubricated in accordance with the needs of the draft chain 28. The rear shaft 25 is driven by a gearing 31 from a powerful electric motor 32 which rests on the foundation 22. From shaft 25 chains 28 are driven. Adjustment of chains 28 for slack is achieved through the adjustable journal box 33 slidable by its adjusting screw in the axial plane of shafts 24 and 25.

Figure 1:
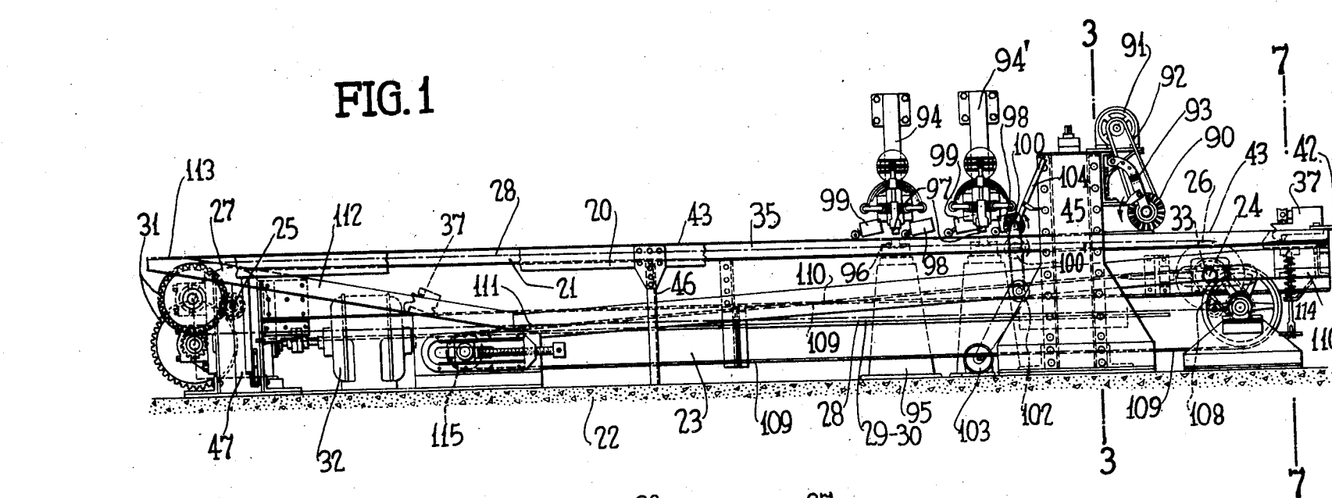
Figure 1 is a left side elevation of the apparatus.
Figure 2:
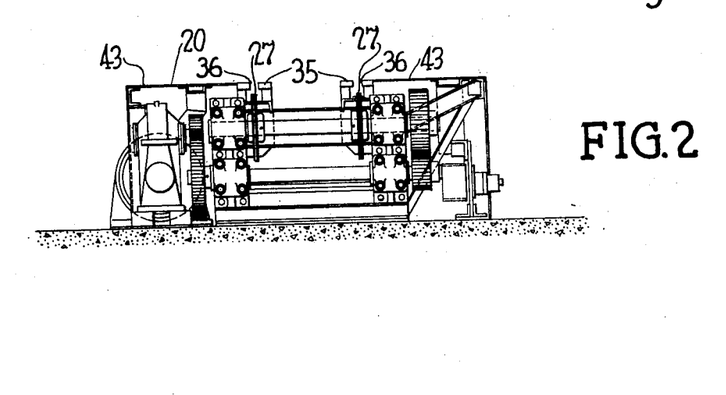
Figure 2 is a rear end elevation showing the motor power unit.
Figures 7, 8:
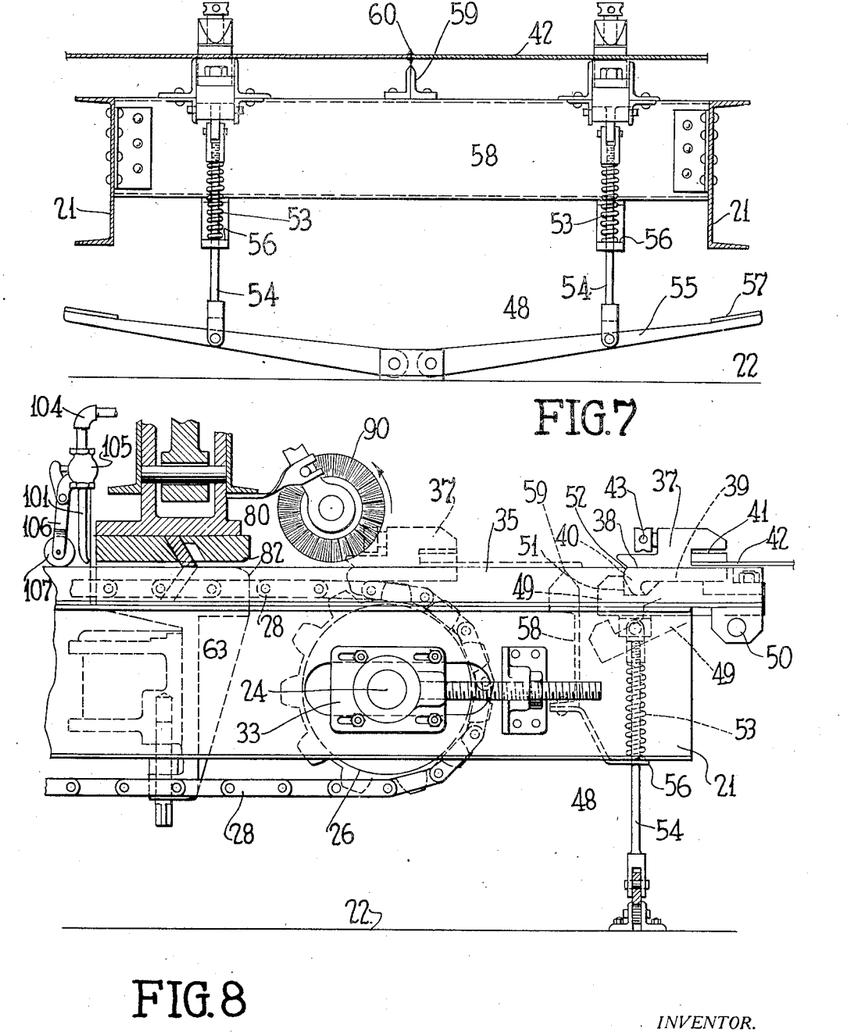
Figure 7 is a partial transverse cross section taken approximately on line 7—7 of Fig. 1 and depicting releasable aligning means which co-act with the clamps through which the pull of the draw bench is exerted on the sheet.
Figure 8 is an enlarged side elevation of its draft mechanism in its relation to the cutters as it appears generally in a view taken approximately on a line 8—8 appearing in Fig. 3.

The upper branches of chains 28 which overlie the upper supports and guides 29 travel in a trough composed of laterally disposed walls 34. Superimposed on these walls are longitudinally extending rails 35 which overhang the trough formed by walls 34 and comprehend between them slots 36 overlying and paralleling longitudinally the chains 28 and their path of travel. The rails 35 and the slots 36 extend substantially the full length of the machine as shown in Fig. 1 and beyond the shafts 24 and 25. See also Fig. 8. Adapted to travel guided in slots 36 and supported upon rails 35 are separable work clamps 37. These work clamps per se are the subject of a separate application. For the purposes of this application it is sufficient to say, having particular reference to Fig. 8, that their main bodies are provided with shoulders 38 which rest on the tops of the rails 35 and shanks 39 which enter the slots 36. The shanks 39 at their rear ends are provided with hooks 40 adapted to engage into the links of the chain 28 as shown in dotted lines in Fig. 8 when clamps 37 are slid over the rails 35 into overlying relation to the chain. This they do because the hooks 40 depend to a depth which reaches into the body of the chain. The body of the clamp is provided with relatively adjustable jaws 41 adapted to receive the sheet stock product 42 between them in a substantially horizontal plane closely adjacent the tops of the rails 35. The jaws are adjusted by turning the horizontally arranged screw 43 which acts on the adjustable jaws 41 to open and close them by any suitable mechanism but which mechanism it is not needful to describe here. As rigidly held in a pair of these clamps 37, one in each slot 36, and guided thereby through the close fitting engagement of the shoulder 38 and the shank 39 with the rails 35, sheet stock product 42 may be entered upon the draw bench by either manually or automatically shoving the product 42 toward the rear of the draw bench 20. When the clamps 37 reach the dotted line position shown in Fig. 8, hooks 40 ride over the central links of the chain and between the laterally disposed links, becoming hooked over the advance end of one of the central links or the connecting pin between the links, whereupon when chains 28 are in motion the work 42 is drawn jointly by them over the top of the draw bench.

The top of the draw bench outwardly of the chains 28 and the guide rails 35 is covered like the top of a table by means of sheet metal plates 43 which are supported on the inner edges from the beams 34 and on their outer edges from longitudinally extending frame members 44 supported horizontally by the uprights 45, 46, 47 and the like. Such construction enables sheet stock products of very wide expanse to be supported in a substantially horizontal plane without distortion of their central portions which lie between the rails 35 and which portions are the portions to be operated upon.

At the forward ends of the beams 21 (see Figs. 7 and 8) is arranged a work aligning and entrance release mechanism designated generally 48. The principal elements of this mechanism comprise a pair of pivoted positioning arms 49 for the work drawing clamps 37. One of these arms 49 is pivoted forwardly at 50 to project rearwardly into each slot 36. The rear ends of the arms are provided on their uppermost sides with transversely aligned slots 51 substantially truly at right angles to the rails 35 and the direction of draw of the bench. The rear ends 52 of the clamps 37 behind the hooks 40, or other parts of the clamps 37 identically located as respects the depth of the jaws 41 of the clamps 37, project into the aligned slots 51 and bear against the transversely aligned rear walls thereof. Thereby by reason of the identical dimensional relations between the ends 52 and the depth of the jaws 41 of the respective clamps, when a sheet stock product 42 is entered between the jaws 41 as far as it will go forwardly, that is to say, to the bottom of jaws 41, the sheet stock product itself has its forward edge truly transversely aligned as respects the direction of draw of the bench. These positioning arms 49 are normally spring pressed upwardly into clamp engaging position by means of spiral springs 53 which surround vertically extending operating rods 54 having a pivotal connection with arms 49 at their upper ends and a pivotal connection with transversely extending foot pedal levers 55 at their lower ends, whereby the arms 49 may be drawn downwardly to release the aligned clamps 37 and the aligned work for process through the machine. Springs 53 react against fixed stops 56. Foot pedals 57 on levers 55 project from opposite sides of the machine to points where they can be readily reached by the feet of operators on opposite sides of the machine.

In the longitudinal plane of symmetry of the draw bench midway between the rails 35 and slots 36 supported on beam 58 transversely of the bench is mounted a work centering gauge 59. This gauge is in the form of a point projecting vertically upward into proximity to the lower surface of the work 42. At the time the work 42 is being transversely aligned by the mechanism 48 just now described, and before the clamps 37 are tightened on to the work, the flash welded seam 60 of the work is placed in vertical alignment with the pointed centering gauge 59. If through transverse alignment of the work 42 as just now outlined, or other alignment, the flash welded seam 60 is brought into parallelism with the rails 35 and the slots 36, then the placement of the seam vertically above the gauge 59 assures its passage over the draw bench in parallelism with the direction of the draw bench pull and centrally thereof.

Figure 3:
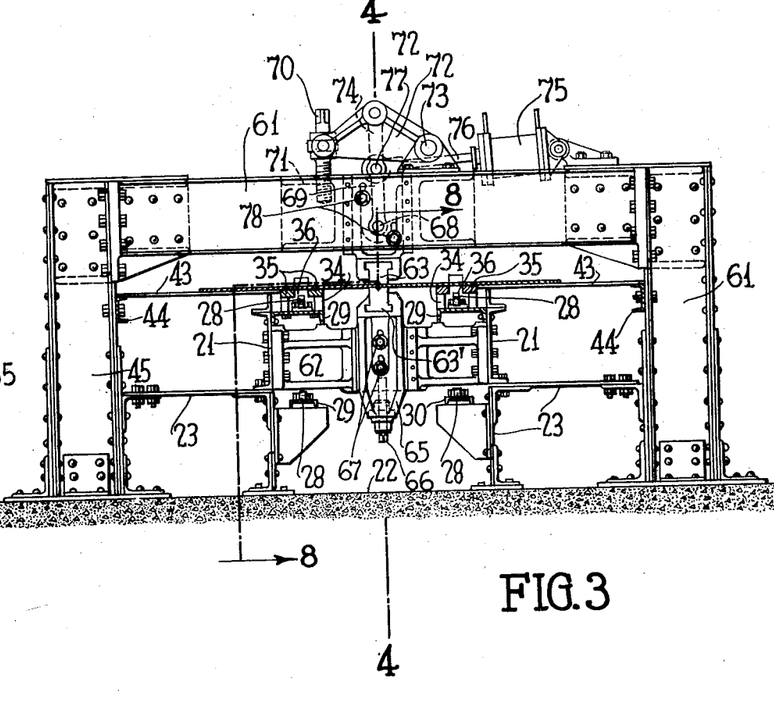
Figure 3 is an enlarged front end elevation.
Figure 4:
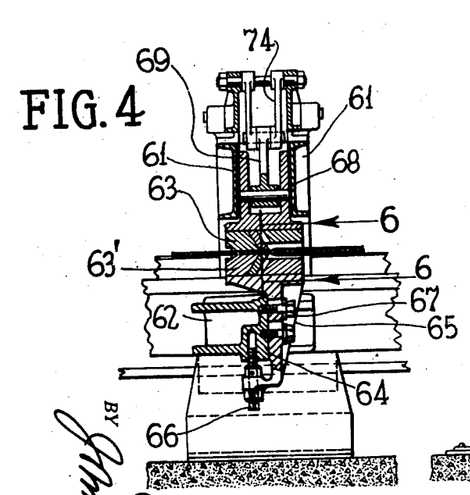
Figure 4 is a section in the vertical longitudinal plane local to the cutters for removing the main body of the flash and taken approximately on line 4—4 of Fig. 3.

The uprights 45 are near the forward end of the draw bench but somewhat beyond the forward chain shaft 24. These uprights are of very substantial proportions in the form of steel pillars of very large cross section. Their upper ends extend a considerable distance above the top of the bench and as clearly appears in Fig. 3, support rigidly a pair of heavy transversely extending channel beams 61 spaced longitudinally apart a small distance. In transverse alignment with pillars 45 and beams 61 in general but below the top of the bench is a heavy cast steel shelf 62 rigidly connected to and spanning the space between the main beams 21 of the bench. The vertically opposed cutters 63 and 63' for the removal of the main body of the flash are supported respectively from the overlying and underlying transverse supports 61 and 62 so afforded. Both cutters lie in the longitudinal plane of symmetry of the bench and both are vertically adjustable in that plane toward and from the work. The lower cutter 63 is adjustable by means of a sliding connection 64 of its head 65 with the support 62 as effected by the screw 66 and fixed by the bolts 67. This is a more or less permanent adjustment. The adjustment of the upper cutter 63' is effected by a sliding engagement 68 of its head 69 with the upper support 61. Two means are provided for making such adjustments, one a semi-permanent adjustment through a screw 70 entering the guide block 71 and operating to raise and lower one end of a transversely extending arm 72 pivoted at 73 to a fixed support and connected with the head 69 through a toggle 74. When the toggle is extended, movement of the screw gives fine adjustments of the cutter head 69 up or down. The second adjustment is in the nature of a bodily removal of the cutter 63' to or from the work. It comprises a reciprocatory motor 75 having a connection 76 through a rod as 76 with the center 77 of toggle 74. When shown with the center 77 of toggle 74. When the motor retracts rod 76, it breaks toggle 74 and raises cutter head 69. Both adjustments can be fixed by tightening clamping bolts 78.

Figure 5:
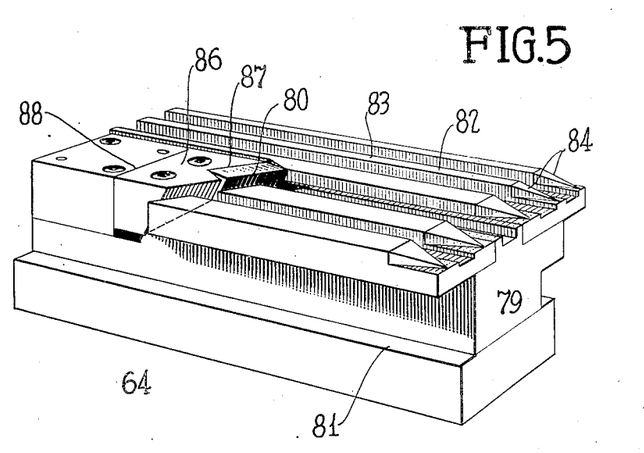
Figure 5 is a general perspective of one of the opposed pair of cutter heads.
Figure 6:
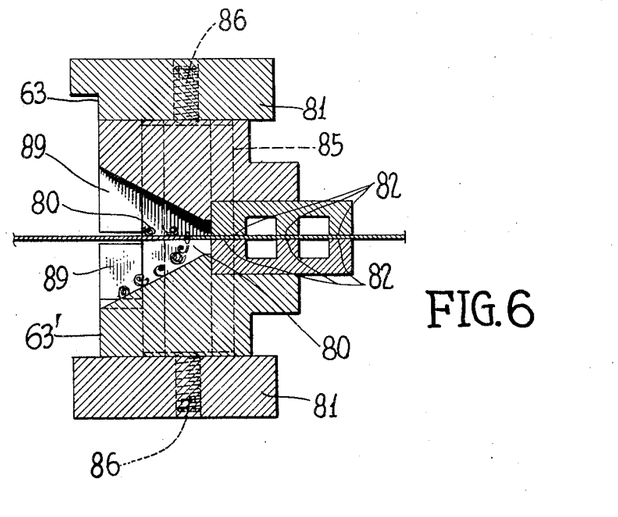
Figure 6 is a transverse cross section of the opposed pair of cutter heads taken approximately on line 6—6 of Fig. 4 looking in the direction of the arrows.

The cutters 63 and 63' themselves are shown in detail in Figs. 5 and 6. They comprise main bodies 79 and oblique cutting edges 80. The main bodies have interlocking connections 81 with the cutter heads of dovetail or other commonly used form for ready adjustment and strong fastening to the cutter heads. These connections 81 are removably connected with the bodies to allow for the replacement in case of wear. On the opposite sides the main bodies are provided with work engaging faces 82 of relatively large and expansive area as compared with the size of the cutting edge 80. These faces are in the form of plates removably secured to the body 79 likewise for renewal in case of wear. The faces 82 are longitudinally ribbed as at 83 and the individual ribs are pointedly sharpened away from the general plane of the engaging face as defined by the tops of the ribs 83, on their forward ends 84, for the purpose of assuring easy entry of the work and prevention of jamming due to irregularities, refuse or the like. Refuse would pass between the ribs clear of the surface of the sheet and such slight refuse as might enter between the top of a rib and the surface of a sheet due to the narrowness of the rib would soon become dislodged and enter one of the spaces adjoining. The cutting edges 80 are centrally socketed in the bodies 79 well within the borders of the expansive work engaging area of the faces 82. The cutting edge 80 is in general transverse to the length of the cutter and inclined rearwardly from its point of engagement of the work as appears in Fig. 5. The sockets 85 in which the cutting edges 80 are seated extend all the way through the bodies 79 and to the connecting member 81. Set screws 86 threaded in these connecting members bear on the ends of the cutting tools 80 and provide a means for accurate relative adjustment with respect to the plane of the work engaging faces 82. Cutting tools 80 are further clamped in place by the wedge shaped clamping blocks 86 which react between inclined engagement 87 with the inclined rear face of the tool 80 and a fixed abutment 88, the abutment being fixedly bolted in place to the bodies 79 and the clamp adjustably bolted. Chip receiving and discharging recesses 89 are formed in the body 79 leading laterally outward on one side as shown in Fig. 6. The recesses are divergent outwardly and inclined generally rearwardly of the body 79.

Between the forward end of the machine and the cutter 63 and supported from the transverse beam 61 is a transversely arranged rotary brush 90 of a length extending a considerable distance transversely on both sides of the plane of symmetry of the draw bench and preferably extending all the way across the top 43 so as to cover sheet stock product of a width the maximum the machine will take. This brush is rotated counter clockwise as viewed in Fig. 1 by means of a motor 91 connected with it by a belt 92. Both the motor and the brush are borne by brackets 93 connected with the beam 61, the brush adjustable toward and from the upper side of the draw bench. This brush rotated at high speed cleans the sheet of refuse and throws it back from the region of the cutters 63.

Figure 9:
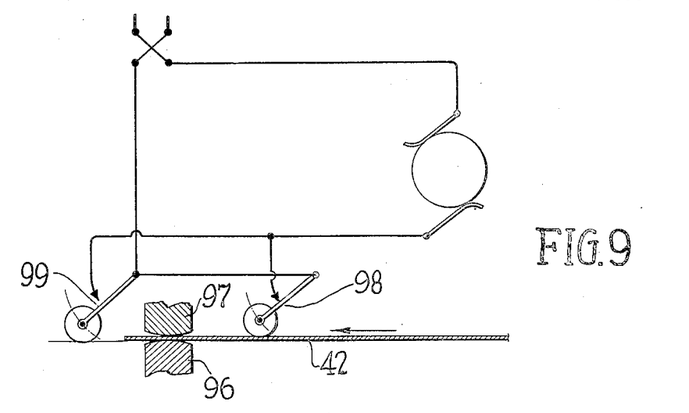
Figure 9 is a diagram of the electrical connections controlling the hammer operating motors.

To the rear of the cutter 63 and of the pillars 45, as appears in Fig. 1, are located a series of forging devices 94 in the form of power hammers. Two of them are shown. They are carried on bases 95 from foundation 22. While the bases 95 are arranged transversely to one side of the body of the draw bench, the anvils 96 and the hammers 97 operate substantially in the longitudinal plane of symmetry of the draw bench midway between the rails 35 and the chains 28 and in alignment with the cutters 63 in the same plane. The anvils 96 may have direct support from the bed 22 by an appropriate extension or base 95, (not shown), or by an arm therefrom, and the hammer heads 97 are appropriately supported and operated from overhanging arms as usual in power hammers. Cut on and cut off switches 98 and 99, respectively, are provided, one pair for each hammer for the purpose of controlling the electric motor which drives the hammers, which motor is not shown but is of the usual type and the usual connection with the reciprocable hammer heads 97. The peculiar characteristic of these switches is that the advance switch 98 is engaged by the work 42 to cut the motor on and the following switch 99 when it leaves the sheet is operated to cut the motor off. This means that the two switches 98 and 99 control the motor in parallel being successively closed and opened by the traverse of the sheet. A circuit of these connections is shown in Fig. 9. The use of two such switches insures the starting of the hammers just before the sheet reaches the hammer and the stopping of the hammer just after the sheet leaves so that the seam is hammered from end to end. The advance hammer 94 is so adjusted and of such power that it partially reduces what remains of the flash while the following hammer 94' is so set and of such power either alone or supplemented by yet other hammers that it effects the completion of the reduction of the flash.

Intermediate the cutters 63 which lie behind the pillar 45 (see again Fig. 1) and the series of hammers 94, are the means 100—101 (see also Fig. 8) for removing refuse which may enter upon the surface of the work intermediate the cutter 63 and the forging devices 94. 100 are the motor driven brushes revolving as the arrows and like the brush 90, extending a considerable distance on each side of the plane of symmetry and preferably all the way across the sheet. They are driven by a train of transmission 102 from the electric motor 103 on the foundation 22. The upper brush 100 is transversely supported by brackets 104 from the pillars 45 and the beams 61. A lower brush 100' driven by a chain or belt connection shown is located vertically below the upper brush 100 and cleans the under side of the sheet simultaneously. The device 101 is a compressed air nozzle supplied with air from any suitable source indicated generally by the pipe 104. The air is admitted to and cut off from the nozzle 101 by a valve 105 opened and closed by a lever 106 which bears through an anti-friction roller 107 upon the upper side of the work 42 as it is progressed over the bench 20. When the work 42 strikes roller 107, it cuts the air on and when the work 42 leaves the roller, the air is cut off. The nozzle 101 is directed transversely of the bench at such an angle as to forcibly sweep from its surface refuse which may accumulate thereon. It dis-lodges all particles which are sufficiently loose to be dis-lodged by the air blast independently of mechanical action of brush 100. In fact some refuse dis-lodged mechanically by brush 100 as it rotates counter clockwise, as shown in Fig. 1, is thrown within the area swept by the nozzle 100 and then being freed, is swept from the sheet by the air blast.

Driven from the forward chain shaft 24 by a train of gearing 108 is a conveyor belt 109 the upper branch of which traverses the bottom of an inclined trough 110 the purpose of which is the return of clamps 37 which may have been separated from the work at the rear end of the apparatus, to the forward end. To best serve these purposes the trough 110 is inclined upwardly in the direction of travel of its upper branch toward the forward end of the machine whereby its rear end 111 may be dropped sufficiently to permit loading by gravity. To this end a loading trough 112 extending from the rear end of the machine 113 at the level of the top 43 of the bench downwardly and forwardly makes connection at its lower end with the lower end of trough 111 above the conveyor belt 109. At the forward end of the apparatus the trough 110 discharges into a receiving box or closed trough and 114 adapted to receive and store the returned clamps 37. One of these clamps 37 is shown descending the loading trough 112 toward the top of the conveyor belt 109. Belt 110 is provided with an adjustable journal box 115 for tightening. Preferably there is arranged a conveyor system 109—110—112, etc. on each side of the machine for the convenience of operators.

Figures 10, 11, 12:
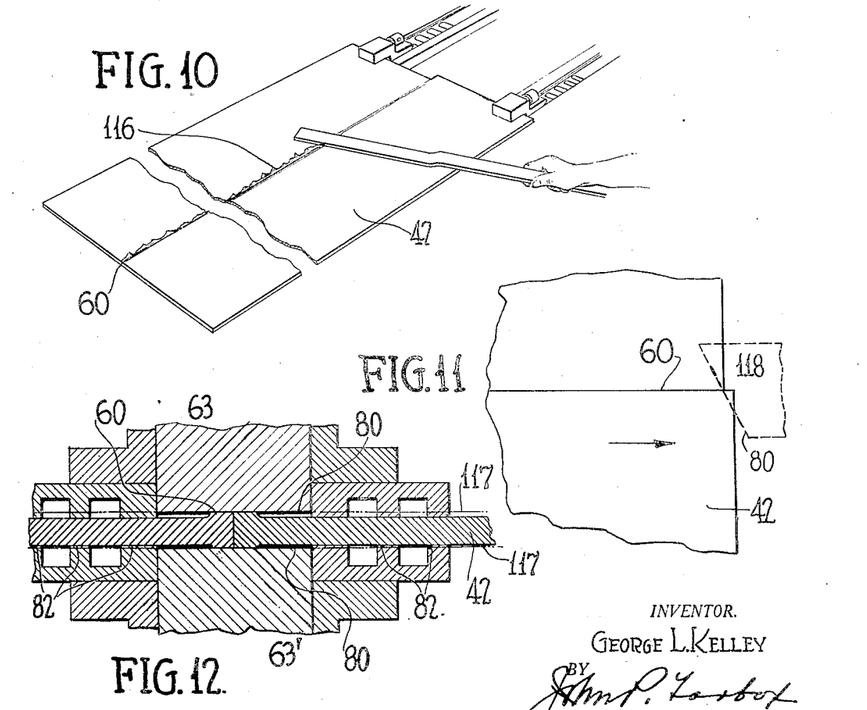
Figure 10 is a perspective showing a step of the manual removal of the higher and more brittle portions of the flash.
Figure 11 is an enlarged plan view of the ends of the flash welded parts of the sheet 42.
Figure 12 is a transverse cross section through the cutter head 63—63' showing the relation of the planes of flash removal to the body of the sheet.

In normal operation this apparatus carries out the method of my invention in full except for the two initial steps which are manually performed before the sheet stock product 42 is progressed through the apparatus. The first step is illustrated in Fig. 11. It consists in the relative arrangement of the two sheets which are joined by the flash welding them together so that an end 118 of one of them projects beyond the adjacent end of the other. In this wise such projecting end 118 is adapted to enter the more readily between the faces 83 of the cutting tools 63—63', and more particularly to enter between and be positioned strongly vertically by the cutting edges 80 of the tools. Note that the edges of these tools extend at an angle to the line of the flash and transversely across the ends of both parts of the material 42. The second step consisting of the removal by impact of such flash as may readily be removed by impact is illustrated in Fig. 10 in which the relatively high flash 116 is shown as being knocked off by a steel bar manipulated by an attendant of the machine. Sweeping this bar horizontally back and forth over the top surface of the sheet which normally has the high and readily removable flash, the operator breaks off the thinner and more brittle portions of the flash which are likely to become dis-lodged on slight accounts, constituting refuse and jamming between the cutters. The work before, during or after these operations are performed upon it is next transversely aligned as respects the longitudinal plane of symmetry of the apparatus by carriage forwardly to the bottoms of the jaws 41 of the clamps 37 while they in turn are truly transversely aligned by the mechanism 48, the principal elements of which are the arms 49 which are provided with their transversely aligned slots 51. Due allowance in relative position of clamps 37 is made for the forward projection of edge 118, see Fig. 11. Before, during or after this operation the seam 60 is longitudinally aligned to substantial parallelism with the plane of symmetry by registry with the gauge 59 shown and described in connection with Fig. 7. These aligning operations complete, the jaws 41 of clamps 37 are closed, and foot pedals 57 are operated to withdraw levers 49 from the path of the clamps 37 in the slots 36. When the attendants (in the apparatus illustrated by hand) advance the work 42 to the dotted line position shown in Fig. 8 in which the hooks 51 of clamps 37 engage into the chains 28 symmetrically, the chains 28 as driven by motor 32 progress the work 42 toward the cutters 63. The pull of the chains is symmetrically balanced about the plane of symmetry of the machine in which plane due to the organization of the machine and the steps of alignment and clamping just now recited, the seam 60 lies in common with cutters 63, anvils 96 and hammer heads 97 of the hammers 94. In other words, the seam 60 carrying the body of the flash to be removed is parallel to the symmetrically acting forces which are drawing the wide and expansive sheet metal stock over the bench 20. All surface refuse which has accumulated either during the flash welding operation, or the subsequent impact removal of flash, in preparation of its end as shown in Figs. 10 and 11, is removed progressively as the work and the flash of seam 60 are progressed toward the cutters 63 by the rapidly rotating brush 90 which sweeps it backwardly and preferably off of the sheet. The front edge of the work 42 as it appears in Fig. 11, enters between the ribbed faces 82 of the cutters 63 and is guided, aligned, and supported against distortion throughout their expansive area surrounding the cutting edges 80. The nicety of the adjustment of these edges which may be achieved jointly through the various individual and collective screw adjustments associated with cutting edges 80 and upper and lower cutter heads 65 and 69, enables the cutting edges 80 and the supporting faces 82 to be adjusted relative to each other and relative to the work with the greatest nicety. They are so adjusted that their cuts substantially truly oppose each other and react the one against the other in their simultaneous cutting action whereby there is a minimum tendency to displacement vertically of the body of the work 42 in either direction. Such tendency to displacement as may be present due to differences in transverse cross section of the upper and lower flash, and differences in hardness, are most readily absorbed by the expansive bolstering faces 82. Any slight refuse which may by untoward chance pass the rapidly rotating brush 90, or become lodged intermediate the brush 90 and the cutters 63, or may by adherence reach the cutters 63, is diverted by the pointed ends 84 of the ribs of the supporting faces 83 which appear in Fig. 5, or if not so dislodged, are by their very irregularity soon swept over the tops of the ribs into the spaces between them. The result of all of these steps and provisions taken together is a smooth and perfect removal of the main body of the flash.

The main body of the flash so removed as shown in Fig. 12 extends not precisely to the surface of the work 42 immediately flanking the seam 60 but in that close proximity thereto defined by a plane 117 removed from this surface by tolerances which will admit the passage of those ordinary surface undulations which cannot be avoided in the surface of normal sheet stock. Adjustment to these tolerances is possible by means of the adjusting means provided and this adjustment and removal of the main body of the flash preliminarily to this depth constitutes an important step of the process, since as explained, it precludes the sharp cutting edges 80 of the cutters 63 (see Fig. 5) from cutting into the surface of the sheet stock product 42 in such manner as to either reduce its gauge or to scar it and thereby to render ultimate polishing difficult or impossible. Passing from the cutter 63 where this step of the method is carried out, the surfaces of the product are once more cleansed of refuse by the joint action of the air blast 101 (see Fig. 8) and the upper and lower brushes 100 which sweep from it not only all loose refuse coming from chips of flash as removed by the cutter 63 but also any foreign matter which may enter between the cutters 63 and the hammers. Cut on successively by the progress of the work 42 past the switches 98—99, the hammers 94 successively engage the seam 60 to reduce that portion of the flash which remains below the tolerance plane 116 progressively in stages according to the number of hammers used, precisely to the gauge of the stock of which the sheet product is composed. What happens is that the seam left thicker than the gauge of the sheet stock product by the tolerances within the removal planes 117 of Fig. 12 is by the successive forging operation of hammers 94 progressively thinned and widened to a very slight degree, the gross width of the sheet product of the sheet being increased by the same few thousandths that the seam 60 has widened. The fact that this is progressive, plus the fact that it is relatively thin sheet stock which is being operated upon, admits of this forging operation without consequential temporary or final distortion or other irregularity in the sheet. By utilizing an appropriate number of hammers 94 in the series, these forging operations can be adjusted to take care of any reasonable tolerances within the planes 117 and likewise to reduce the thickness of the seam 60 precisely to the gauge of the sheet stock of the work 42.

As the sheet passes from the last of the switches 99, the last of the hammers is cut out, the sheet is progressed to the rear end 113 of the draw bench 20. Clamps 37 are removed during such progress or after its cessation. The clamps 37 are thrown to the troughs 112 whence they return to the advance end of the machine and the sheet product 42 is transferred to further treatments having to do with its ultimate fabrication.

Supplemental features of the method comprehend the relative adjustment of the faces 82 of the upper and lower cutting heads 63—63' a distance from each other substantially equal to the gauge of the material being operated upon. They thus more or less closely engage these surfaces and tend to iron out the surface undulations and the more accurately align the same with respect to the cutting edges 80 and to accurately place the plane of cutting parallel to the flattened body of the sheet. Within the ordinary variations in gauge encountered, say 2/1000 or 3/1000 of an inch or thereabouts, the transverse frame 61 of the apparatus will permit the cutter heads 63—63' to rise and fall elastically to accommodate these variations. The likewise supplemental detailed feature of the method is the relative adjustment of the cutting edges 80 (again see Fig. 12) slightly within the faces 82, the upper edge 80 2/1000 or 3/1000 of an inch in and the lower edge 80 1/1000 or 2/1000 of an inch in. This adjustment plus the tendency of the oblique cutting edges 80 to draw the sheet 42 toward themselves effectually and stably preserves the relation of their cutting plane 117 to the faces 82 of the cutter heads and the surfaces of the work 42 upon which these faces 82 bear. In other words, the tolerances between the plane of cutting 117 and the surfaces of the work 42 are by these steps and means more accurately and certainly maintained.

That the method and machine of so great apparent fundamental nature should be subject to modification and improvement would seem to be a foregone conclusion. On this account it is submitted that the annexed claims should have their scope interpreted solely in the light of the scope of the real invention involved over and above the prior art and not by the imposition of restriction drawn from terminology which grows out of the exigencies of description.

What I claim as new and useful and desire to protect by Letters Patent is:—

1. The method of removing flash from the flash welded seams of thin metal sheets which consists in pulling the sheet past fixed cutters in a direction parallel to the seam and simultaneously engaging the flash of opposite faces of the seam with the cutters.

2. The method of removing the flash from thin metal sheets having flash welded seams which consists in pulling the sheet past fixed cutters engaged with the flash, the while exerting the pull parallel to the seam and symmetrically on opposite sides thereof.

3. The method of removing the flash from flash welded articles of thin metal sheets which consists in preparing one end of the flash for easy entry to flash removing cutters, and thereafter pulling the sheet longitudinally past opposed fixed cutters engaged with the flash initially by way of the prepared end thereof.

4. The method of removing flash from thin metal sheets fabricated by flash welding which consists in preliminarily removing from the surfaces of the sheet carrying the flash all loose refuse therefrom, and thereafter cutting the main body of the flash from the product by engagement therewith in planes in very close proximity to the surface of the sheet, whereby scarring of the product by the passing of refuse between the cutters and the sheet is prevented.

5. The method of removing flash from the flash welded seams of thin metal sheets which consists in cutting the body of the flash from the seam by relative movement of seam and cutting tool longitudinally of the seam, and the while supporting the sheet against distortion from the cutting operation on both sides of the sheet and in an extensive zone surrounding the cutting operation at any instant.

6. The method of removing the flash from articles fabricated of thin metal sheets which consists in pulling the sheet to carry its seam longitudinally past a relatively fixed cutter and in flash removing engagement therewith, and the while supporting opposite faces of the sheet against distortion either from the cutting operation or the pulling operation on both faces of the sheet in an extensive zone immediately surrounding the cutting operation at any instant.

7. The method of removing flash from thin metal sheets fabricated by flash welding which consists in first removing the main body of the flash in planes removed from the surfaces of the sheet a distance sufficient to prevent unwonted scarring of the surfaces of the sheet due to surface variations within permissible tolerances, and thereafter hammering that part of the flash remaining on account of said tolerances down to the gauge of the material constituting the body of the sheet, but intermediate the removal of the main body of the flash and the step of hammering clearing the article of all flash refuse which might enter between the hammers and the sheet and occasion surface marring.

8. The method of removing flash from thin metal sheets flash welded together, which consists in pulling the sheets in a direction parallel to the weld past fixed cutters simultaneously engaging the opposite sides of the flash, the while guiding the sheets through an extensive area on both sides of the cutters to prevent buckling of the sheets.

9. The method of removing flash from thin metal sheets flash welded together, which consists in pulling the sheets in a direction parallel to the weld past fixed cutters engaging with the flash, the while guiding the sheets through an extensive area on both sides of the cutters and sheet to prevent buckling of the sheets.

GEORGE L. KELLEY.